United States Patent
Chen et al.

(10) Patent No.: US 11,870,612 B2
(45) Date of Patent: Jan. 9, 2024

(54) METHOD OF ADAPTIVE TERMINATION CALIBRATION

(71) Applicant: Intel Corporation, Santa Clara, CA (US)

(72) Inventors: Huimin Chen, Beaverton, OR (US); Naveed Khan, Folsom, CA (US); Tony L Lewis, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 759 days.

(21) Appl. No.: 16/831,650

(22) Filed: Mar. 26, 2020

(65) Prior Publication Data

US 2020/0228375 A1 Jul. 16, 2020

(51) Int. Cl.
*H04L 25/03* (2006.01)
*H04L 25/02* (2006.01)

(52) U.S. Cl.
CPC ...... *H04L 25/0298* (2013.01); *H04L 25/0278* (2013.01)

(58) Field of Classification Search
CPC ... H04L 25/0298; H04L 25/0278; H04L 1/20; H04B 17/11; H04B 17/21
USPC .......................................................... 327/65
See application file for complete search history.

(56) References Cited

U.S. PATENT DOCUMENTS

| | | | | |
|---|---|---|---|---|
| 8,638,838 | B1* | 1/2014 | Betts | H04L 7/033 |
| | | | | 375/295 |
| 8,963,578 | B2* | 2/2015 | Wu | H04L 25/0278 |
| | | | | 326/26 |
| 9,048,814 | B2* | 6/2015 | Shibayama | G06F 13/4086 |
| 9,197,464 | B2* | 11/2015 | Wu | H04L 25/0278 |
| 9,213,667 | B2* | 12/2015 | Cranford, Jr. | G06F 13/423 |
| 9,235,543 | B2* | 1/2016 | Cranford, Jr. | G06F 13/423 |
| 9,571,098 | B2* | 2/2017 | Kim | H04B 1/0483 |
| 9,584,222 | B2* | 2/2017 | Tatsumi | H04B 10/505 |
| 9,633,698 | B2* | 4/2017 | Chun | G06F 11/076 |
| 10,114,788 | B2* | 10/2018 | Berge | G06F 13/4282 |
| 10,223,320 | B2* | 3/2019 | Berge | G06F 15/7817 |
| 11,152,944 | B2* | 10/2021 | Kathuria | H03K 21/08 |
| 11,442,883 | B2* | 9/2022 | Bito | G06F 13/4059 |

(Continued)

*Primary Examiner* — Ryan Jager
(74) *Attorney, Agent, or Firm* — Compass IP Law PC

(57) ABSTRACT

Methods and apparatus for adaptive termination calibration of high-speed links. The methods provide a novel termination calibration obtained in conjunction with link training without using an external reference under which the termination resistors for transmitters (Rtx) and receivers (Rrx) are calibrated to the real channel impedance as part of the link training. The techniques may be implemented to optimize high-speed link operation in terms of impedance match between a channel's characteristic impedance and the source termination of a transmitter and the receiver termination of a receiver. During link training, both Rtx and Rrx are adjusted to maximize a peak amplitude of a received signal. Under one approach for bi-directional links, the Rrx for the receivers at both ends of the link are calibrated substantially concurrently. Under another approach, a calibrated Rrx for a first receiver is used for calibrating the Rrx for the second receiver. An Rtx may be set equal to an calibrated Rrx or may be calibrated separately.

18 Claims, 8 Drawing Sheets

(56) References Cited

U.S. PATENT DOCUMENTS

| | | | |
|---|---|---|---|
| 11,626,874 B2* | 4/2023 | Kathuria | H03K 19/01 |
| | | | 377/112 |
| 2010/0275084 A1* | 10/2010 | Ichimiya | H04L 1/1854 |
| | | | 714/E11.131 |
| 2014/0253208 A1* | 9/2014 | Ruberg | H04L 25/028 |
| | | | 327/331 |
| 2016/0197598 A1* | 7/2016 | Wu | H03K 19/017545 |
| | | | 327/108 |
| 2017/0134026 A1* | 5/2017 | Kuroiwa | H03K 19/0175 |
| 2020/0228375 A1* | 7/2020 | Chen | H04L 25/0278 |
| 2021/0083677 A1* | 3/2021 | Kathuria | H03K 19/01 |

* cited by examiner

METHOD OF ADAPTIVE TERMINATION CALIBRATION

BACKGROUND INFORMATION

Today's high-speed input/output (I/O) interfaces use multiple external resistors or expensive on-die precision resistors to achieve characteristic impedance matching between the silicon transceiver and the channel characteristic impedance. Both motherboard and on-die resistors consume valuable physical area, add complexity to the system, and increase power consumption. In some cases the system yield decreases due to inability to match the transceiver termination and the channel characteristic impedance.

Two approaches used today include:
RCOMP using external resistor (resistor located on package or printed circuit board (PCB)).
RCOMP using expensive on-die precision resistors.

For RCOMP, a resistor with a fixed and precise value is chosen as the reference—this resistor is usually a discrete components on the package or board; in some silicon processes, an expensive on-die precision resistor is available too. Calibration is a two-step process:
1. A Compensation state-machine on the silicon calibrates the resistance of a Replica-termination circuit to match to the resistance-value of the reference resistor.
2. The digital-codes from the Compensation state-machine are forwarded to all the transmitters (Tx) and receivers (Rx) on the high-speed analog-front-end, and the codes are then used to program the termination resistances.

The current methods of RCOMP calibrates to a fixed-value resistor. This method is only good for an ideal channel i.e., a channel where every single component matches to the reference impedance. Due to HVM variations, component may generally have +/−20% variation from the ideal value; however, the Tx/Rx termination as a design target is not adjusted to the real operating channel. The HVM variations and the impedance-discontinuity it creates results in signal distortion due to reflections, and the signal-integrity degrades.

From an implementation perspective, this method also suffers from a number of challenges and performance degradation. Since the reference resistor is external to the silicon, routing of the reference resistor on to the silicon will cost pins when placed outside of the package. Note that most packages do not have enough space to place external components on the package. Having to route the reference resistor on package and motherboard adds DC (direct current) resistance that is sensitive to ambient temperature, thus degrading reference accuracy. In addition, the routing channel is also susceptible to noise coupling, thus requiring additional board space for noise isolation. Another disadvantage is the system on a chip (SoC) usually needs multiple Rcomp resistors of different values. This consumes board area, increases cost, and drives manufacturing/inventory complexity.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
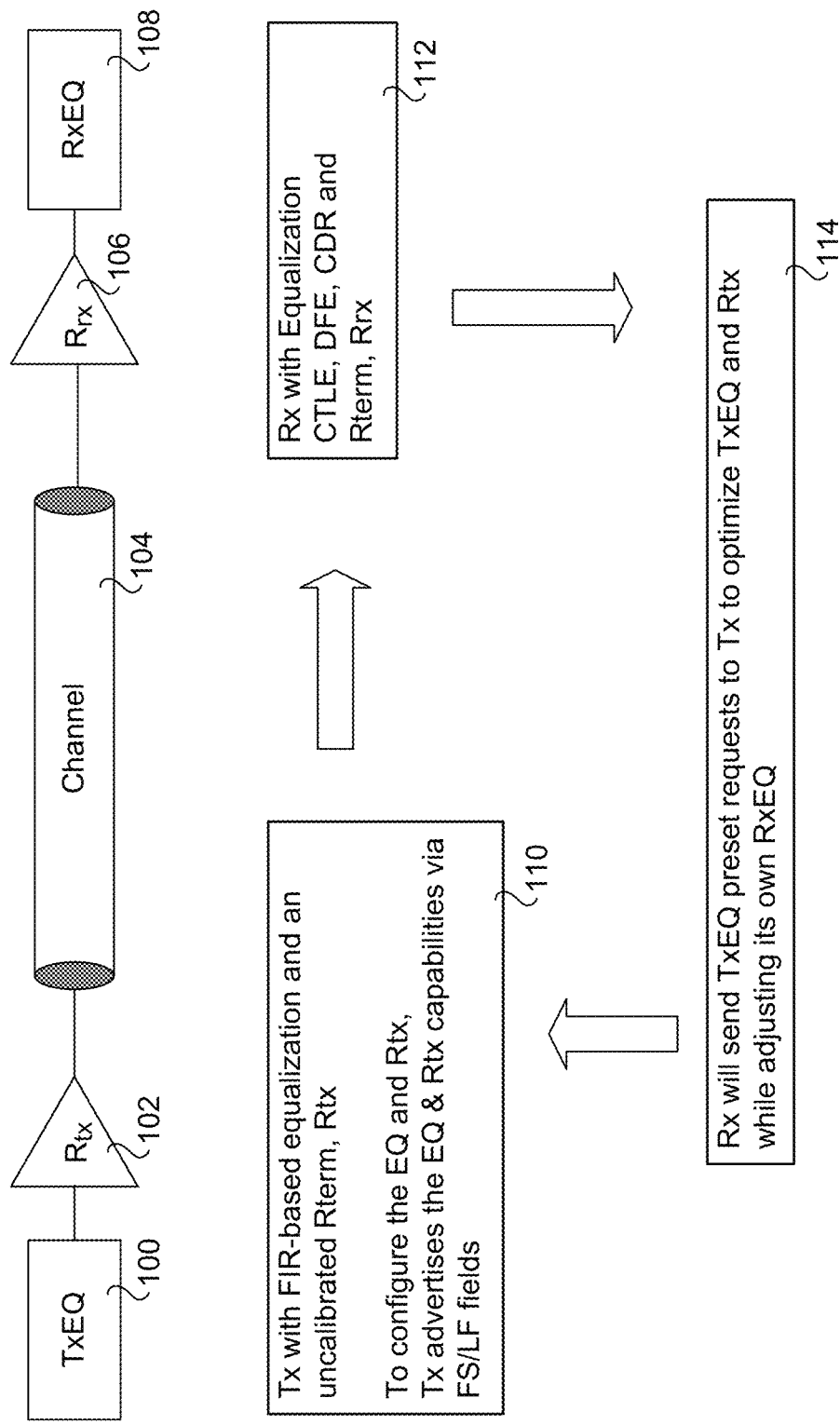
FIG. 1 is a diagram illustrating an overview of a novel termination resistor calibration process, according to one embodiment.

Embodiments of methods and apparatus for adaptive termination calibration of high-speed links are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The embodiments disclosed herein provide a novel termination calibration obtained in conjunction with link training without using an external reference: the termination-resistor is calibrated to the real channel characteristic impedance as part of the link training. The techniques may be implemented to optimize high-speed link operation in terms of impedance match between a channel's characteristic impedance and the source termination of a transmitter (Tx) and the receiver termination of a receiver (Rx). This method of calibrating an on-die termination resistor to the real channel will improve system yield, reduce power, and eliminate the need for an external reference for the purpose of termination-calibration.

The physical interconnect between the Host and Device, also called channel, is composed of various components such as package and motherboard traces, vias and resistors/capacitors etc. Each of the channel component are designed for a target impedance and insertion-loss, but typically have +/−20% variations in impedance and Insertion-loss (IL). When the signal is launched at the transmitter, it experiences the channel impairments in the form of Insertion and Return loss and reaches the receiver with its original signal distorted. The proposed method of RCOMP calibration relies on a feedback-loop between Tx and Rx to optimize the Eye-opening. The goal of this calibration is to achieve an impedance match as defined by:

$$R_{tx}=R_{rx}=Z_0,$$

where $R_{tx}$ is the resistance at the termination of the transmitter, $R_{rx}$ is the resistance at the termination of the receiver, and $Z_0$ is the channel's characteristic impedance that is to be matched. $R_{tx}$ and $R_{rx}$ are also referred to as termination resisters $R_{term}$. For convenience, the subscripts for these terms are dropped in the following text Under the following embodiments the Link Initialization state is used to achieve the RCOMP calibration. During this initialization state, there is a dynamic equalization between the Tx and Rx. RCOMP calibration is a new step that is added on to this equalization loop. FIG. 1 shows an example how this loop would work.

An overview of the novel calibration process, according to one embodiment, is shown in FIG. 1, which includes a Tx equalization block (TxEQ) 100, a transmitter termination resister $R_{tx}$ 102, a channel 104, a receiver termination resister $R_{rx}$ 106, and an Rx equalization block (RxEQ) 108. FIG. 1 shows a single direction of a communication channel, which for illustrative proposes will be from a transmitter on a host to a receiver on a device.

After the Host and the Device are first connected and powered-on, they go through different stages of link initialization including Link Equalization. During this process, the dynamic equalization and calibration happens conceptually in the following phases:

Phase 0: Tx and Rx exchange equalization presets at an operational lower data-rate, where link training is not required. These presets will be used upon entering the next phase which is at the targeted data-rate.

Phase 1: Start the downstream link training towards the negotiated data rate for the linke, while the upstream link continues to operate at a lower data rate to maintain a reliable feedback channel. This is to allow Rx to direct Tx to program TxEQ and Rtx, based on Rx training. A random training pattern such as a pseudo-random binary sequence (PRBS) may be used for the link training. The Tx EQ capabilities may be a pre-defined combination of TxEQ and Rterm codes.

Phase 2: The downstream component adjusts the upstream Tx equalization settings while adjusting its own Rx until achieving an optimal eye-opening.

Phase 3: Start the upstream link training towards the negotiated data rate, while keeping the downstream link at the negotiated data rate after training and using it as a feedback channel. Given the downstream link is trained, the TxEQ, RxEQ, Rtx, and Rrx set for the downstream link may be used as the initial settings for upstream link training. The process repeats as defined in phase 2 until successful upstream link is trained.

At the end of this cycle, the Tx and Rx will identify the optimal settings for equalization and termination to achieve the required eye-opening.

Figure 2:
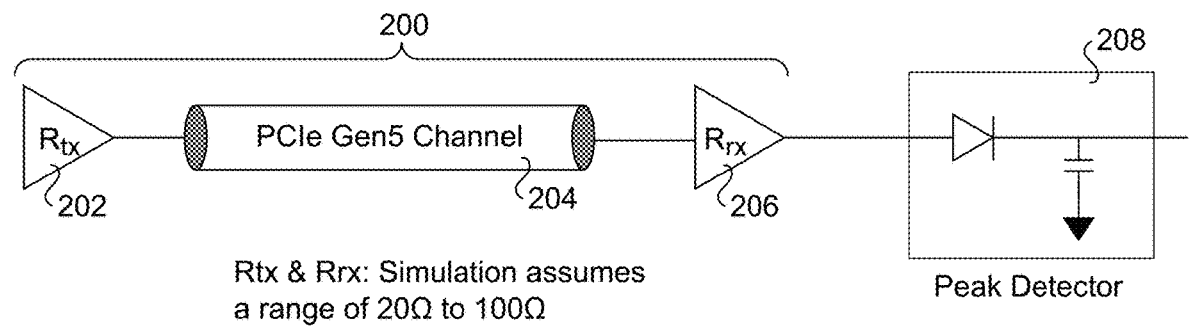
FIG. 2 is a diagram illustrating a simulated Peripheral Component Interconnect Express (PCIe) fifth generation (Gen5) Tx to Rx Channel (aka data link) used to produce the simulation graph of FIG. 3.

As shown in a block 110 in FIG. 1, in one embodiment the transmitter is configured with finite impulse response (FIR)-based equalization and an uncalibrated transmitter termination resister Rtx. To configure the equalizer (EQ) and Rtx, the transmitter advertises the EQ and Rtx capabilities via FS/LF (Full Swing/Low Frequency) fields in the training ordered sets. A block 112 depicts a receiver with equalization, CTLE (continuous time linear equalization), DFE (decision feedback equalization), CDR (clock and data recovery) and receiver termination resister Rrx. As shown in a block 114 associated with Phase 2, the receiver will send TxEQ preset requests to the transmitter to optimize TxEQ and Rtx while adjusting it own RxEQ. As depicted by the arrows, this loop is repeated The foregoing principle is demonstrated using simulation results on a Peripheral Component Interconnect Express (PCIe) fifth generation (Gen5) Tx to Rx Channel (aka data link), as shown the block diagram in FIG. 2. The data link 200 components include an Rtx 202, a PCIe Gen5 channel 204, and an Rrx 206 that is coupled to a peak detector 208. The data link was simulated at 32 GT/s, with all the impairments e.g., crosstalk, device jitter, insertion and return-losses modeled in the channel. An actual implementation of the calibration scheme requires a hardware mechanism that identifies the peak eye at the Rx. In the simulations, the peak-detector were emulated using simulation software.

Figure 3:
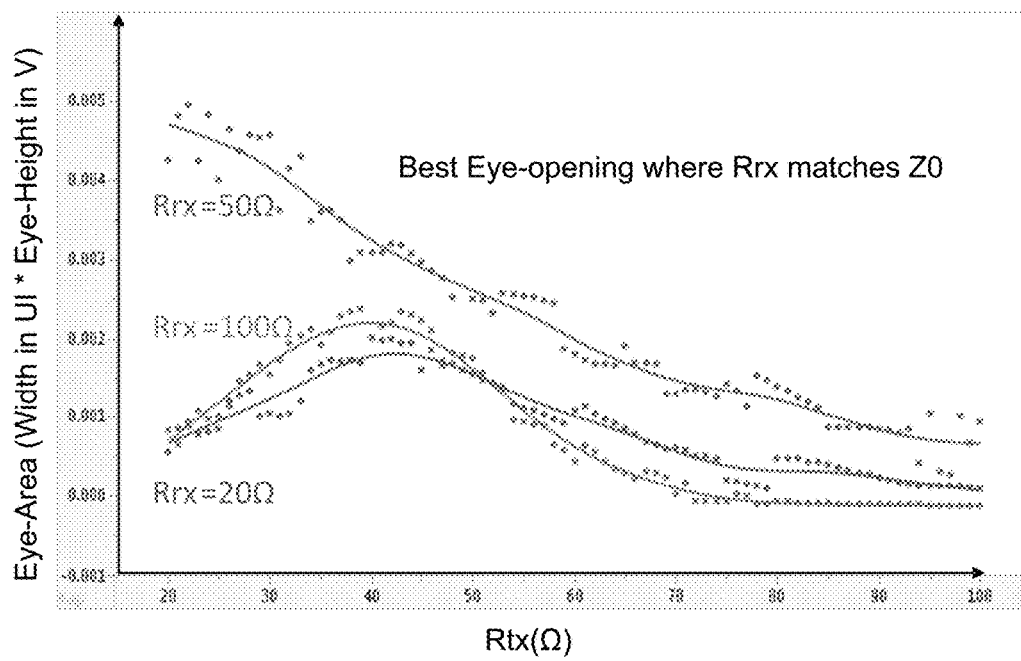
FIG. 3 is a graph generated using the simulated link of FIG. 2 and illustrating eye area vs. Rtx using Rrx values of 20Ω, 50Ω, and 100Ω.
Figure 4:
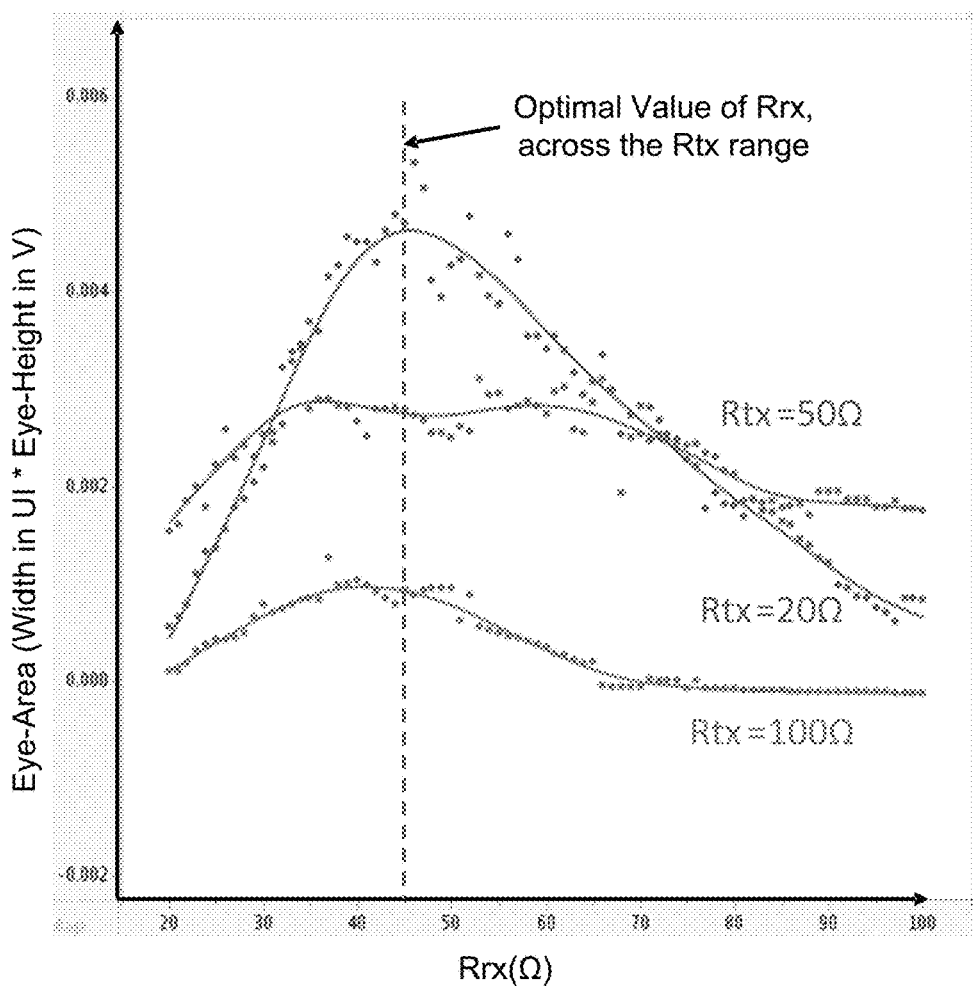
FIG. 4 is a graph showing a plot of eye area vs. Rrx using Rtx values of 20Ω, 50Ω, and 100Ω.

The simulation setup had two impedance sweeps: Rtx and Rrx were both swept from 20Ω to 100Ω—this 5× range is used to model an uncalibrated Rterm. With each sweep, the Receiver, in this case, does the CTLE and DFE equalizations, and the simulation tool monitors the received eye. FIG. 3 shows the received Eye-Area (defined as Eye-Width in UI*Eye-Height in V) plotted against Rtx (Ω), with three curves of Rrx overlaid, with example Rrx values of 20Ω, 50Ω, and 100Ω. FIG. 4 shows a plot of Eye-Area vs. Rrx using Rtx values of 20Ω, 50Ω, and 100Ω. This plot shows the optimal value of Rrx is independent of the value of the Rtx.

Figure 5:
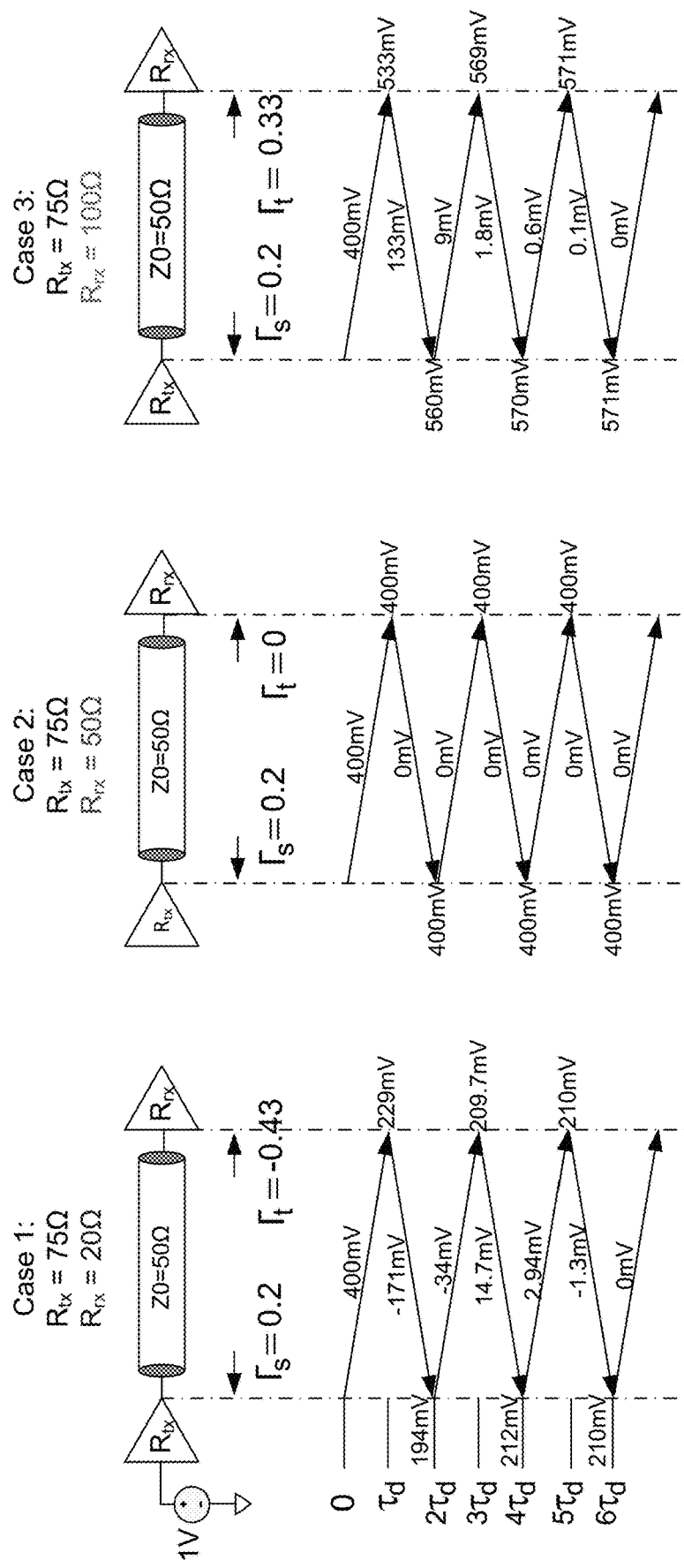
FIG. 5 show three lattice diagrams illustrating signal reflections using different values for Rtx and Rrx.

FIG. 3 shows that the Receiver sees the largest-eye when Rrx matches the channel's characteristic impedance, which in this case is close to 50Ω Single-ended. The reason for this has to do with the signal-reflections and ISI (Inter-symbol-interference), and is explained with a lattice-diagram in FIG. 5. When the Receiver is not matched to the channel, as shown by Case 1 and Case 3 in FIG. 5, it reflects the received signal back to the Transmitter, and causes ISI with the oncoming bit patterns. Depending on the channel memory and the Rtx, the ISI can impair multiple bit patterns. Essentially, a given bit will be affected by multiple previously launched bits, and in turn each bit will corrupt multiple future bits. On the other hand, when the Receiver is matched to the channel, as shown by Case 2, there is no reflection and hence no ISI. This explains why the 50Ω curve in FIG. 3 has the best eye opening.

The following describes how a high-speed link implements Rterm calibration during the Link training, according to one embodiment. For a dual-simplex (aka bi-directional) link such as PCIe, each data-lane has a Tx and an Rx pair that operate independent of Tx/Rx for other data lanes, as shown in by a dual-simplex high-speed link 600 between a host-side input-output (IO) interface 602 and a device-side IO interface 604 in FIG. 6. Host-side IO interface 602 includes a transmitter 606 and a receiver 608. Device-side IO interface 604 includes a receiver 610 and a transmitter 612. A high-speed downlink channel 614 is connected between the host-side transmitter 606 and the device-side receiver 610, while a high-speed uplink channel 616 is connected between device-side transmitter 612 and host-side receiver 608.

Figure 6:
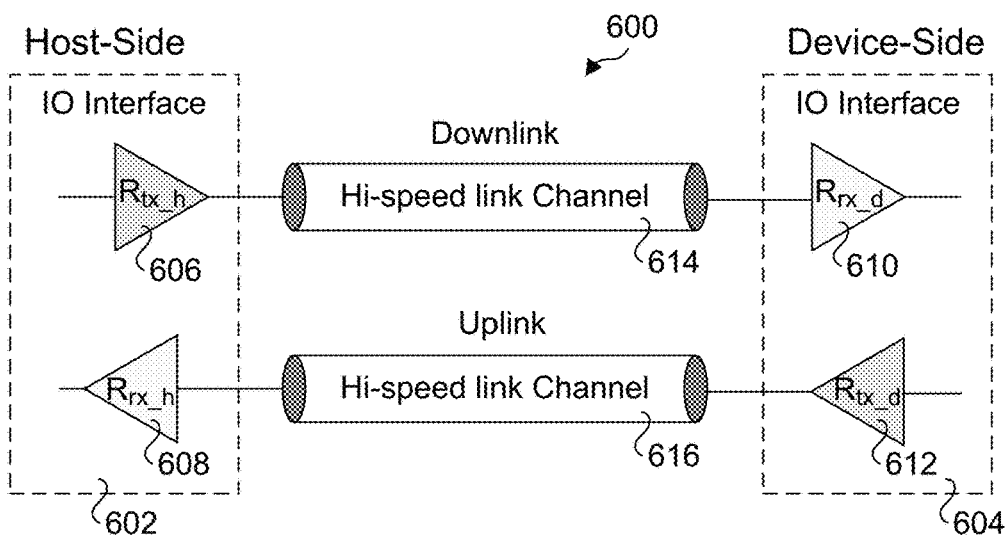
FIG. 6 is a diagram illustrating the host-side and device-side IO interfaces coupled via a dual-simplex link.

In FIG. 6, Rtx_h and Rrx_h respectively represent the termination resistor of the Tx and Rx at host-side IO interface 602, while Rtx_d and Rrx_d represent the termination resistor at device-side IO interface 604. In the following discussion, when the host and device distinction is not necessary, Rtx will mean Rtx_h and Rtx_d, while Rrx will mean Rrx_h and Rrx_d.

Figure 7A:
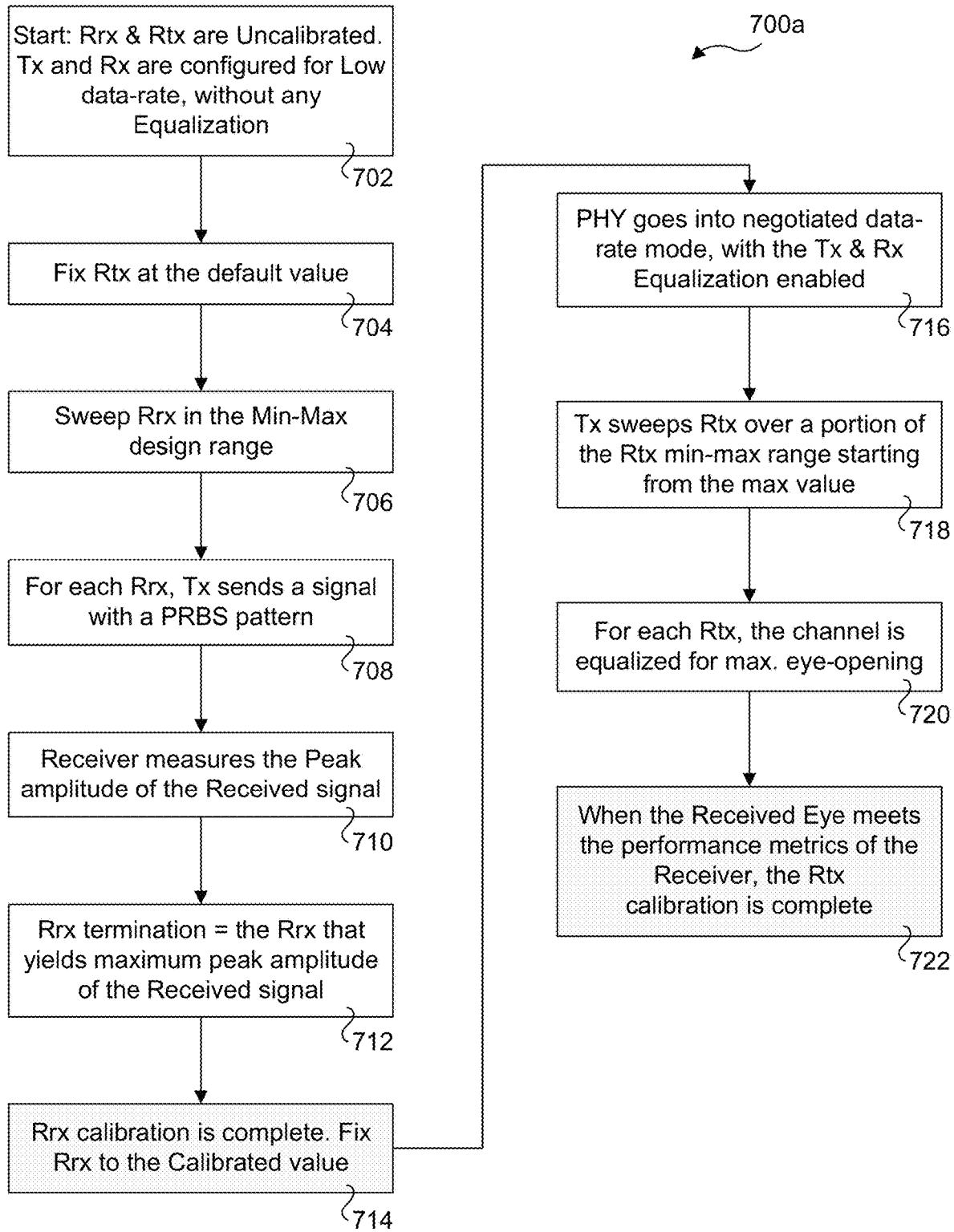
FIG. 7a is a flowchart illustrating operations for calibrating Rrx and Rtx according to a first embodiment.

FIG. 7a shows a flowchart 700 illustrating operations performed to initialize and configure one direction of a dual-simplex link, according to one embodiment. As depicted in a block 702, at the start of the process the Rrx and Rtx are uncalibrated. Also, Tx and Rx are configured for a low data-rate, without any equalization. In a block 704, the Rtx is fixed at a default value. In a block 706, Rrx is swept through a range of resistance values, such as a minimum-maximum (min-max) design range in one embodiment. Generally, the min-max design range may vary for different applications and types of links. In one embodiment, Rrx and Rtx are digital potentiometers that can be programmed to change their resistances on a stepped basis. Accordingly, sweeping Rrx (or Rtx) through a min-max range may be performed by programmatically changing the resistance of Rrx (or Rtx). Optionally, Rrx and Rtx may be implemented using a mix of analog and digital circuitry under which the resistance value is adjusted using a digital controller or the like that adjusts analog circuitry used to implement an adjustable resistance (i.e., a potentiometer).

As depicted in a block 708, for each Rrx (each Rrx step in the sweep from min-max), Tx sends a PRBS pattern. In a block 710, the receiver measures the peak amplitude of the received PRBS pattern. In a block 712 the Rrx termination value is set to the Rrx that yields the maximum peak amplitude of the received signal. As depicted by a block 714, the Rrx calibration is complete. Rrx is then fixed to the calibrated value (the Rrx termination value in block 712).

In a block 716, the PHY (Physical Layer) for the link goes into a negotiated data-rate mode with Tx and Rx equalization enabled. In a block 718 the Tx sweeps Rtx over a portion of the min-max design range for Rtx starting from the maximum value. For each Rtx step (in value), the channel is equalized for maximum eye opening at the receiver. As depicted in a block 722, when the received eye meets the performance metrics of the receiver, the Rtx calibration is completed. Generally, the performance metrics of the receiver will be one or more predefined metrics, such as specified in a standard for the link (e.g., PCIe 4.x, PCIe 5x, CXL 1.0, or any other communication link standard. In all or nearly all cases the Rtx value at which the received eye meets the performance metrics will be above the min Rtx value, thus the Tx sweep of the Rtx in block 718 will end up covering only a portion of the Rtx min-max design range.

In some embodiments, Rtx and Rrx pairs for both the downlink channel and uplink channel are calibrated (substantially) concurrently in conjunction with link training for the downlink and uplink channels.

Figure 7B:
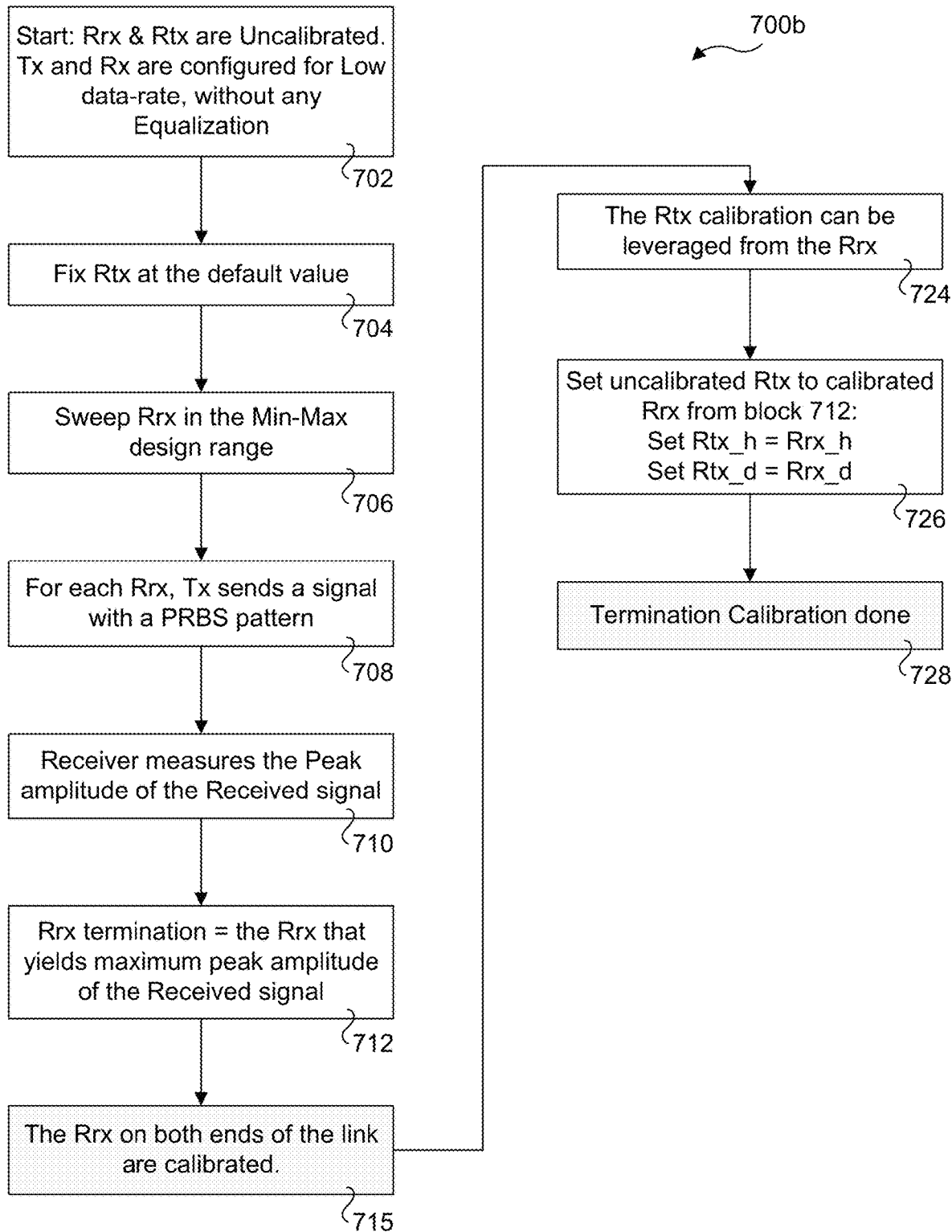
FIG. 7b is a flowchart illustrating operations for calibrating Rrx and Rtx according to a second embodiment in which Rtx is set a calibrated Rrx.

FIG. 7b shows operations performed for calibrating Rrx and Rtx for uncalibrated channels using logic embedded in the IO interfaces, according to an embodiment. The operations in block 702, 704, 706, 708, 710, and 712 are the same as shown in flowchart 700a, with the calibration of the Rrx for both channels being performed in conjunction with link training for the channels (and thus performed substantially concurrently. As shown in a block 715, following the operation of block 712 (for both channels) the Rrx on both ends of the dual-simplex link are calibrated. As shown in a block 724, the Rtx calibration (for a channel) can be leveraged from the Rrx calibrated in block 712 for the channel. As depicted in a block 726, Rtx is set to Rrx such that Rtx_h=Rrx_h and Rtx_d=Rrx_d. At this point, the resistor termination calibration for the dual-simplex link is done, as shown in a block 728.

Figure 7C:
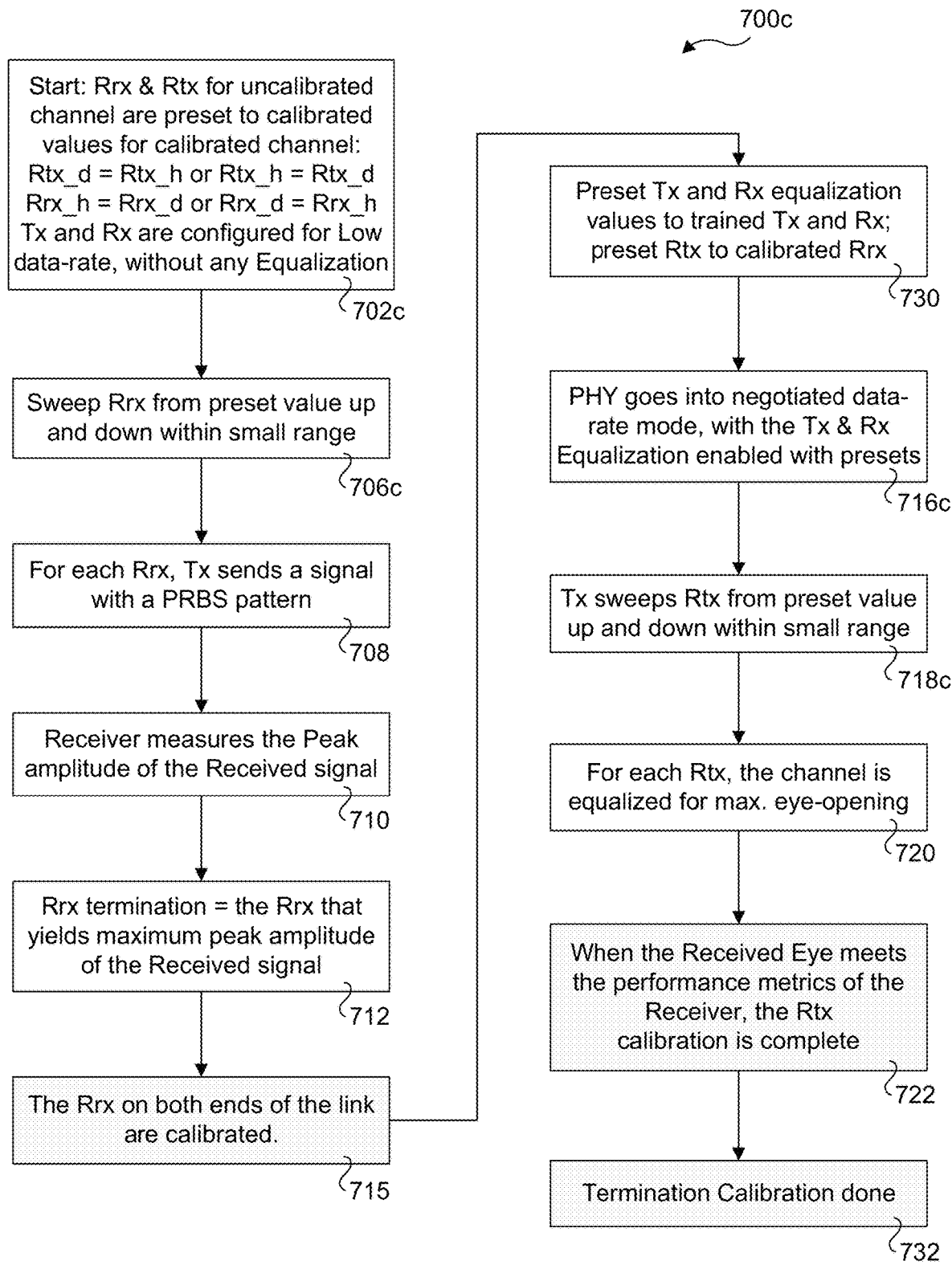
FIG. 7c is a flowchart illustrating operations for calibrating Rrx and Rtx for a second link using calibrated Rrx and Rtx for a first link, according to one embodiment.

FIG. 7c shows a flowchart 700c illustrating operations for performing Rtx and Rrx resistor termination calibration of a second channel that leverages the termination calibration results of a first channel. Depending on which of the downlink and uplink Rtx and Rrx are calibrated first, the terms first and second channels may respectively apply to the downlink and uplink channels or may respectively apply to the uplink and downlink channels. As shown in a block 702c, the Rrx and Rtx for the uncalibrated channel are preset with the calibrated Rrx and Rtx for the calibrated channel. For example, suppose that Rtx_h and Rrx_d for the downlink channel have been calibrated. Thus Rtx_d is preset to Rtx_h and Rrx_h is present to Rrx_d. If the uplink channel is calibrated first, Rtx_h is preset to Rtx_d and Rrx_d is present to Rrx_h. As before, Tx and Rx for the uncalibrated channel are configured for low data-rate, without equalization.

In a block 706c, Rrx is adjusted from its preset value up and down within a small range (such as <1%). For example, depending on the size of the step value, this may entail adjusting up and down one or two steps from the preset Rrx value, or might involve several steps. The operations of blocks 708, 710, and 712 are similar for those in flowchart 700a, except the maximum peak amplitude will be based on a small range around the preset Rrx value rather than a sweep over the min-max range for Rrx. As shown in block 715, the Rrx (Rrx_d and Rrx_h) on both ends of the link are calibrated.

A similar approach may be used for termination calibration for Rtx. In a block 730 the Tx and Rx equalization values for the uncalibrated channel are set to the trained Tx and Rx values obtained via training for the calibrated channel, while Rtx is preset to the calibrated Rrx obtained in block 712. In a block 716c, the PHY goes into its negotiated data-rate mode with Tx and Rx equalization enabled (but beginning at the preset Tx and Rx values). In block 718c, the Tx adjusts the Rtx value from the preset value up or down within a small range (e.g., <1%) in fine steps. The operations of blocks 720 and 722 are then performed in a similar manner to described above, with the result that Rtx calibration for the second direction is complete in block 722, thus completing resistor termination calibration for the dual-simplex link as shown in block 732.

Figure 8:
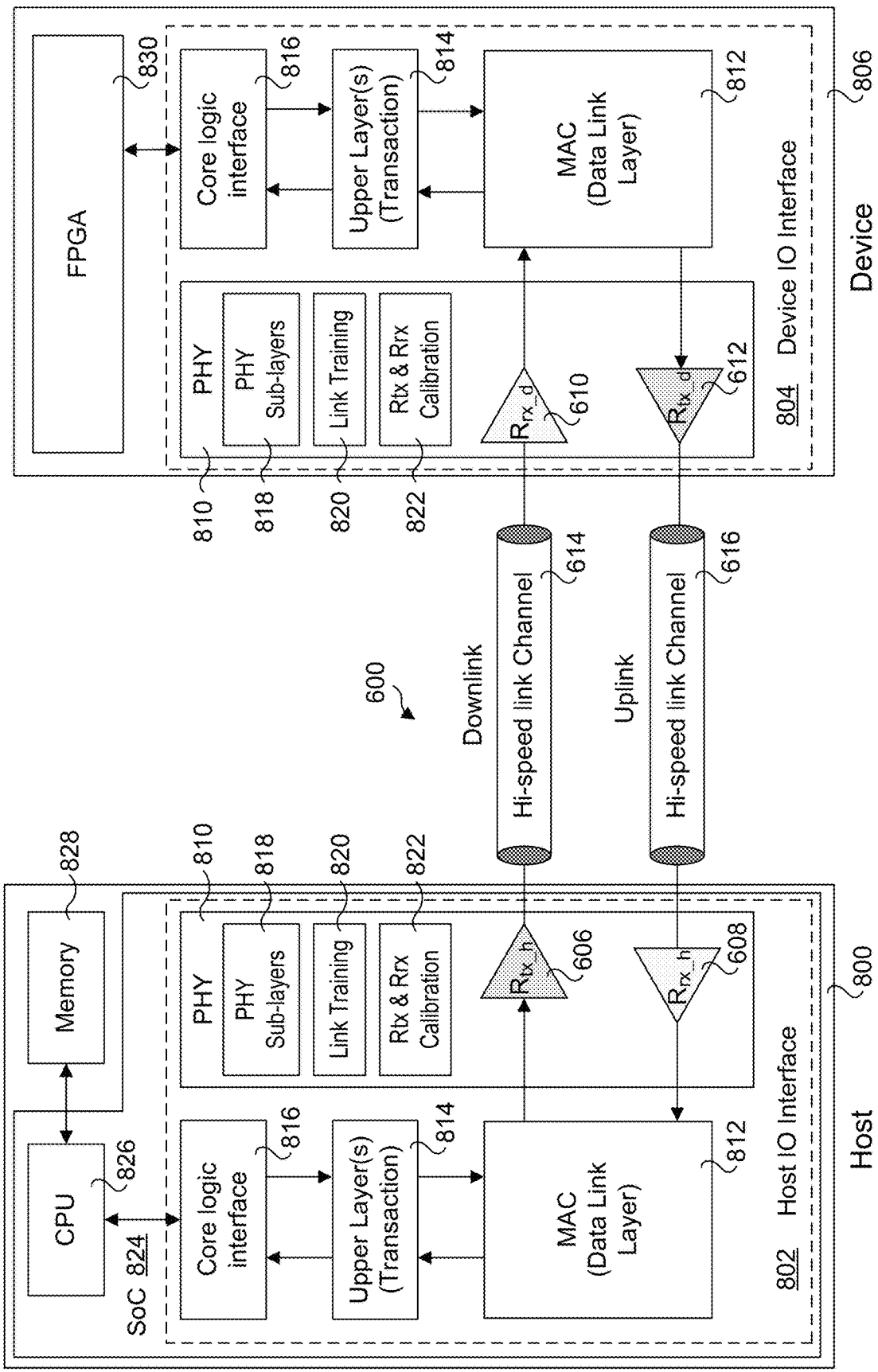
FIG. 8 is a schematic diagram illustrating a host including a host IO interface coupled to a device interface of a devices via a dual-simplex link, which the host and device IO interfaces are configured to calibrate Rrx and Rtx termination resistor values, according to one embodiment.

FIG. 8 shows a host 800 including a host IO interface 802 coupled to a device IO interface 804 of a device 806 via a dual-simplex link 600. Each of host IO interface 802 and device IO interface 804 have similar components including a PHY 810, a Media Access Channel (MAC) layer 812, upper layer(s) 814, and a core logic interface 816. PHY 810 includes PHY sub-layers 818, link training logic 820, Rtx and Rrx calibration logic 822, a transmitter with an Rtx (e.g., transmitters 606 and 612) and a receiver with an Rrx (e.g., receivers 608 and 610).

For IO interfaces comprising PCIe or CXL interfaces, MAC layer 812 comprises a data link layer, and upper layer(s) 814 comprises a transaction layer. Other communication protocols may employ similar or different components and structures, depending on the layer architecture for the communication protocol.

In the embodiment of FIG. 8, host 800 includes a host processor 824 comprising an SoC including a CPU 826 coupled to memory 828 via a memory interface or controller. Device 806 comprises an accelerator including an FPGA 830 configured to perform one or more accelerator functions such as encryption, decryption, compression, decompression, etc.

Generally, the structures of host IO interface and device IO interface represent conventional IO interfaces with the addition of the Rtx and Rrx calibration logic and adjustable Rtx and Rrx termination resistors. In some embodiments, link training logic 820 and Rtx and Rrx calibration logic may be implemented in the same logic block. The functionality performed by the various logic blocks depicted in FIG. 8 may be implemented using various types of embedded logic, including but not limited to predefined or pre-programmed circuitry, programmable circuitry (e.g., programmable logic, FPGA, etc.) or one or more embedded processing elements on which firmware or embedded software is executed. The IO interface circuitry may be integrated into a die of a larger components (such as an SoC) or may comprise a stand-alone chip (such as a PHY chip or IO interface chip.

Generally, the techniques disclosed herein may be used for calibration Rtx and Rrx in IO interfaces for various types of hosts and devices. For example, the host IO interface on the host processor or other host device may be connected to various types of devices (via device IO interfaces on such devices), including but not limited to network adaptor, network interfaces, network interface controllers (NICs), InfiniBand host controller adapters, accelerators and other types of IO devices. The links may include but are not limited to PCIe links and CXL links. In other cases, Rtx and Rrx in the IO interfaces of peer devices may be calibrated using the techniques disclosed herein. For instance, the peer device embodiments do not operate as a host and a device, but rather as peers. Accordingly, for peer device embodiments the Rrx and Rtx at opposing ends of the link are referred to as first and second Rrx and first and second Rtx rather than Rrx_h, Rrx_d, Rtx_h, and Rtx_d.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The operations and functions performed by various components described herein may be implemented by software or firmware running on a processing element, via embedded hardware or the like, or a combination of hardware and software/firmware. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for calibrating termination resistors for a communication link including a transmitter coupled to a receiver via a channel, the transmitter having an adjustable transmit termination resister (Rtx) and the receiver having an adjustable receiver termination resister (Rrx), the method comprising:
   in conjunction with link training for the communication link,
   using a first calibration process to calibrate a resistance value for the Rrx under which a resistance value of the Rrx is adjusted to obtain a maximum peak amplitude of a signal received at the receiver during transmission of a link training pattern.

2. The method of claim 1, further comprising setting a resistance value for the Rtx equal to the calibrated resistance value for the Rrx.

3. The method of claim 1, wherein calibration of the Rrx comprises:
   adjusting a resistance of the Rrx over a range having multiple resistance values;
   measuring, at the multiple resistance values, a peak amplitude of a training pattern signal received at the receiver that is transmitted by the transmitter; and
   determining a resistance value among the multiple resistance values that yields a maximum peak amplitude of the received signal,
   wherein the calibrated Rrx has a resistance value that yields the maximum peak amplitude of the received signal.

4. The method of claim 1, further comprising using a second calibration process to calibrate a resistance value for the Rtx under which a resistance value of the Rtx is adjusted such that when the Rtx is calibrated a received eye at the receiver meets one or more predefined performance metrics for the communication link.

5. The method of claim 4, wherein the transmitter further includes an equalizer (TxEQ), the receiver includes an equalizer (RxEQ), and wherein calibration of the Rtx comprises:
   operating the physical layer (PHY) for the communication link using a negotiated data rate mode;
   adjusting a resistance of the Rtx over a range having multiple resistance values;
   for each resistance value, equalizing the channel using the TxEQ and RxEQ for a maximum eye-opening of the received signal; and
   determining when the eye of the receive signal meets one or more performance metrics specified for the communication link,
   wherein the calibrated Rtx is set to the resistance value for Rtx when the eye of the received signal meets one or more performance metrics specified for the communication link.

6. The method of claim 1, wherein the communication link is a bi-directional link comprising a downlink channel and an uplink channel coupled between a host input-output (IO) interface and a device IO interface, the host IO interface including a host transmitter connected to a host-side of the downlink channel and a host receiver connected to a host-side of the uplink channel, the host transmitter including an adjustable host transmitter termination resister (Rtx_h) and the host receiver including an adjustable host receiver termination resister (Rrx_h), the device IO interface including a device receiver connected to a device-side of the downlink channel and a device transmitter connected to a device-side of the uplink channel, the device receiver including an adjustable device receiver termination resister (Rrx_d) and the device transmitter including an adjustable device transmitter termination resister (Rtx_d), the method further comprising:
   calibrating a resistance value for the Rrx_d under which a resistance value of the Rrx_d is adjusted to obtain a maximum peak amplitude of a signal received at the device receiver during transmission of a link training pattern over the downlink channel; and
   calibrating a resistance value for the Rrx_h under which a resistance value of the Rrx_h is adjusted to obtain a maximum peak amplitude of a signal received at the host receiver during transmission of a link training pattern over the uplink channel.

7. The method of claim 6, further comprising:
   setting the resistance value of the Rtx_h equal to the calibrated resistance value for the Rrx_h; and
   setting the resistance value of the Rtx_d equal to the calibrated resistance value for the Rrx_d.

8. The method of claim 1, wherein the communication link is a bi-directional link comprising a downlink channel and an uplink channel coupled between a host input-output (IO) interface and a device IO interface, the host IO interface including a host transmitter connected to a host-side of the downlink channel and a host receiver connected to a host-side of the uplink channel, the host transmitter including an adjustable host transmitter termination resister (Rtx_h) and the host receiver including an adjustable host receiver termination resister (Rrx_h), the device IO interface including a device receiver connected to a device-side of the downlink channel and a device transmitter connected to a device-side of the uplink channel, the device receiver including an adjustable device receiver termination resister (Rrx_d) and the device transmitter including an adjustable device transmitter termination resister (Rtx_d), the method further comprising:
   using first and second calibration processes to calibrate an Rtx and Rrx pair in a downlink channel or uplink channel resulting in either calibration of the Rtx_h and Rrx_d or calibration of the Rtx_d and Rrx_h; and
   employing at least a third calibration process to calibrate one of the Rrx_h and Rrx_d that wasn't calibrated in the first and second calibration processes.

9. The method of claim 8, further comprising:
   when Rtx_h and Rrx_d are calibrated during the first and second calibration processes,
      presetting Rtx_d=Rtx_h and Rrx_h=Rrx_d; and
      calibrating Rrx_h during a third calibration process;
   otherwise
   when Rtx_d and Rrx_h are calibrated during the first and second calibration processes,
      presetting Rtx_h=Rrx_h and Rrx_d=Rtx_d; and
      calibrating Rrx_d during a third calibration process.

10. The method of claim 9, wherein calibrating Rrx_h or Rrx_d during the third calibration process comprises:
   when Rtx_h and Rrx_d are calibrated during the first and second calibration processes, adjusting a resistance of the Rrx_h over a small range having multiple resistance values including the preset value for Rrx_h;
measuring, at the multiple resistance values, a peak amplitude of a signal received at the device receiver that is transmitted by the host transmitter; and
determining a calibrated Rrx_h as the resistance value among the multiple resistance values that yields a maximum peak amplitude of the signal received at the device receiver,
when Rtx_d and Rrx_h are calibrated during the first and second calibration processes,
adjusting a resistance of the Rrx_d over a small range having multiple fine resistance values including the preset value for Rrx_d;
measuring, at the multiple resistance values, a peak amplitude of a signal received at the host receiver that is transmitted by the device transmitter; and
determining a calibrated Rrx_d as the resistance value among the multiple resistance values that yields a maximum peak amplitude of the signal received at the host receiver.

11. An apparatus, comprising:
a host having a host input-output (IO) interface including,
a host transmitter with an adjustable host transmitter termination resister (Rtx_h); and
a host receiver with an adjustable host receiver resister (Rrx_h);
a device having a device IO interface including,
a device transmitter with an adjustable device transmitter termination resister (Rtx_d); and
a device receiver with an adjustable device receiver resister (Rrx_d);
a bi-directional communication link comprising a downlink channel coupled between the host transmitter and the device receiver and an uplink channel coupled between the device transmitter and the host receiver,
wherein the apparatus is configured to calibrate Rtx_h and Rrx_d during link training of the downlink channel and calibrate Rtx_d and Rrx_h during link training of the uplink channel, and wherein the apparatus is configured to set the resistance value of the Rtx_h to a predetermined value and set the resistance value of the Rtx_d to a predetermined value prior to calibrating the Rrx_d and Rrx_h.

12. The apparatus of claim 11, wherein calibration of the Rrx_d comprises:
adjusting a resistance of the Rrx_d over a range having multiple resistance values;
measuring, at the multiple resistance values, a peak amplitude of a training pattern signal received at the device receiver that is transmitted by the host transmitter; and
determining a resistance value among the multiple resistance values that yields a maximum peak amplitude of the training pattern signal received at the device receiver,
wherein the calibrated Rrx_d has a resistance value that yields the maximum peak amplitude of the training pattern signal received at the device receiver; and
wherein calibration of the Rrx_h comprises,
adjusting a resistance of the Rrx_h over a range having multiple resistance values;
measuring, at the multiple resistance values, a peak amplitude of a training pattern signal received at the host receiver that is transmitted by the device transmitter; and
determining a resistance value among the multiple resistance values that yields a maximum peak amplitude of the training pattern signal received at the host receiver,
wherein the calibrated Rrx_h has a resistance value that yields the maximum peak amplitude of the training pattern signal received at the host receiver.

13. The apparatus of claim 12, further configured to:
set the resistance value of the Rtx_h equal to the calibrated resistance value for the Rrx_h; and
set the resistance value of the Rtx_d equal to the calibrated resistance value for the Rrx_d.

14. The apparatus of claim 11, wherein the host IO interface and the device IO interface comprises a Peripheral Component Interconnect Express (PCIe) interface or a Compute Express Link (CXL) interface.

15. An apparatus comprising:
a first input-output (IO) interface including,
a first transmitter with a first adjustable transmitter termination resister (Rtx); and
a first receiver with a first adjustable receiver termination resister (Rrx);
wherein the first IO interface is configured to be coupled to a second IO interface in a second apparatus having a second transmitter and a second receiver via a bi-directional communication link comprising a first channel coupled between the first transmitter and the second receiver and a second channel coupled between the second transmitter and the first receiver, and wherein the first IO interface is configured to:
calibrate the first Rrx during link training of one of the first and second channels; and
following calibration of the first Rrx, transmit the calibrated resistance value for the Rrx to the second receiver,
wherein the calibrated resistance value for the first Rrx is used to set a resistance value of an adjustable transmitter termination resister in the second transmitter.

16. The apparatus of claim 15, wherein calibration of the Rrx comprises:
adjusting a resistance of the Rrx over a range having multiple resistance values;
measuring, at the multiple resistance values, a peak amplitude of a training pattern signal received at the first receiver that is transmitted by the second transmitter; and
determining a resistance value among the multiple resistance values that yields a maximum peak amplitude of the training pattern signal received at the first receiver,
wherein the calibrated Rrx has a resistance value that yields the maximum peak amplitude of the training pattern signal received at the first receiver.

17. The apparatus of claim 15, wherein the first IO interface is configured to:
during link training of one of the channels, transmit a training pattern from the first transmitter used to calibrate a second adjustable receiver termination resister in the second receiver;
receive a calibrated resistance value for the second adjustable receiver termination resister at the first receiver; and
set the Rtx equal to the calibrated resistance value for the second adjustable receiver termination resister.

18. The apparatus of claim 15, wherein the first IO interface and the second IO interface comprises a Peripheral Component Interconnect Express (PCIe) interface or a Compute Express Link (CXL) interface.

* * * * *